(12) United States Patent
    Sato

(10) Patent No.: US 12,096,774 B2
(45) Date of Patent: Sep. 24, 2024

(54) SPIDER MITE CONTROL METHOD

(71) Applicant: AQUASOLUTION CORPORATION, Nagano (JP)

(72) Inventor: Takashi Sato, Tokyo (JP)

(73) Assignee: AQUASOLUTION CORPORATION, Nagano (JP)

( * ) Notice: Subject to any disclaimer, the term of this patent is extended or adjusted under 35 U.S.C. 154(b) by 778 days.

(21) Appl. No.: 17/058,213

(22) PCT Filed: May 29, 2019

(86) PCT No.: PCT/JP2019/021250
§ 371 (c)(1),
(2) Date: Nov. 24, 2020

(87) PCT Pub. No.: WO2019/230780
PCT Pub. Date: Dec. 5, 2019

(65) Prior Publication Data
US 2021/0153506 A1     May 27, 2021

(30) Foreign Application Priority Data
May 30, 2018 (JP) .................................. 2018-103188

(51) Int. Cl.
*A01N 59/04*     (2006.01)
*A01N 25/02*     (2006.01)

(52) U.S. Cl.
CPC ............. *A01N 59/04* (2013.01); *A01N 25/02* (2013.01)

(58) Field of Classification Search
CPC ........ A01N 59/04; A01N 25/02; A01N 25/00; A01N 59/00
See application file for complete search history.

(56) References Cited

U.S. PATENT DOCUMENTS

| 7,534,447 | B2 * | 5/2009 | Bessette | ................. | A01N 37/02 |
| | | | | | 424/405 |
| 2009/0053320 | A1 | 2/2009 | Cho | | |
| 2015/0336029 | A1 | 11/2015 | Kobayashi et al. | | |
| 2019/0085279 | A1 * | 3/2019 | Leo | ........................ | A23L 2/56 |

FOREIGN PATENT DOCUMENTS

| JP | 2010-094117 A | 4/2010 |
| JP | 2010-207778 A | 9/2010 |
| JP | 2015-61825 A | 4/2015 |
| JP | 2015-097509 A | 5/2015 |
| JP | 2015-211973 A | 11/2015 |
| JP | 2016-053004 A | 4/2016 |
| JP | 2018-15715 A | 2/2018 |
| JP | 2018-075240 A | 5/2018 |
| KR | 10-0633856 B1 | 10/2006 |

OTHER PUBLICATIONS

Manal S. M. Ismail, Maha F. M. Soliman, Moustafa H. El Naggar and Mona M. Ghallab, "Acaricidal activity of spinosad and abamectin against two-spotted spider mites", Experimental and Applied Acarology (2007) 43:129-135. (Year: 2007).*
Roberto L. Nicastro, Mário E. Sato, Valter Arthur and Marcos Z. da Silva, "Chlorfenapyr resistance in the spider mite *Tetranychus urticae*: stability, cross-resistance and monitoring of resistance", Phytoparasitica (2013) 41:503-513. (Year: 2013).*
Y. Fukumoto, K. Hashizume and Y. Nishimura, "Development of supply system of microbubble ozonated water in agriculture", Horticulture, Environment and Biotechnology, 2010, 51(1), 21-27 (Abstract only). (Year: 2010).*
Y. Fukumoto, K. Hashizume and Y. Nishimura, "Development of supply system of microbubble ozonated water in agriculture", Horticulture, Environment and Biotechnology, 2010, 51(1), 21-27. (Year: 2010).*
Extended European Search Report issued in corresponding European Patent Application No. 19810994.4-1005, dated Jul. 8, 2021.
R. Shibuya, "Application of Fine Bubbles", Journal of the Surface Finishing Society of Japan, vol. 68, No. 6, pp. 335-337, 2017, with partial English translation.
Korean Office Action issued in corresponding Korean Patent Application No. 10-2020-7034107, dated Aug. 21, 2022, with English translation.
Shimane Pref. Pest Control Station, "2017, Information on Forecast of Disease and Pest, Technical Data No. 2, Regarding Generation of Strawberry Mites," Apr. 3, 2017, available at https://www.pref.shimane.lg.jp/industry/norin/gijutsu/nougyo_tech/byougaityuu/gizyutuzyouhou/gijyutuH29.data/170403hadani.pdf, with partial English translation.
Japanese Notice of Reasons for Refusal issued in corresponding Japanese Patent Application No. 2020-522241, dated Jun. 14, 2022, with English translation.
International Search report issued in corresponding International Patent Application No. PCT/JP2019/021250, dated Aug. 13, 2019, with English translation.
Japanese Office Action issued in corresponding Japanese Patent Application No. 2020-522241, dated Nov. 29, 2022, with English translation.

(Continued)

*Primary Examiner* — Mina Haghighatian
*Assistant Examiner* — Nathan W Schlientz
(74) *Attorney, Agent, or Firm* — Rimon P.C.

(57) ABSTRACT

The present invention addresses the problem of providing a spider mite control method that makes it possible to achieve high control effects without using a miticide. A spider mite control method in which nano-bubble water is applied to a plant.

7 Claims, 1 Drawing Sheet

(56) References Cited

OTHER PUBLICATIONS

Cosmos Enterprise Co., Ltd., "a use case of using an agrochemical for the cultivation of agricultural nanobubbles" (the case of using an agrochemical in the cultivation of a cut flower) [online], [search on Nov. 10, 2022], URL:https://www.dreamnews.jp/press/0000040242, with partial English translation.

Mitsui Chemicals Agro Inc., "Ministry of Agriculture, Forestry and Fisheries Registration No. 19656, Agricultural Acaricide Koromite Hydrate," [online], [Search on Nov. 10, 2022] URL:https://www.mitsui-agro.com/assets/pdf/products/chirashi/19656_%E3%83%81%E3%83%A9%E3%82%B7_%E3%82%B3%E3%83%AD%E3%83%9E%E3%82%A4%E3%83%88%E6%B0%B4%E5%92%80%E5%89%A4%E3%83%81%E3%83%A9%E3%82%B7.pdf, with partial English translation.

* cited by examiner

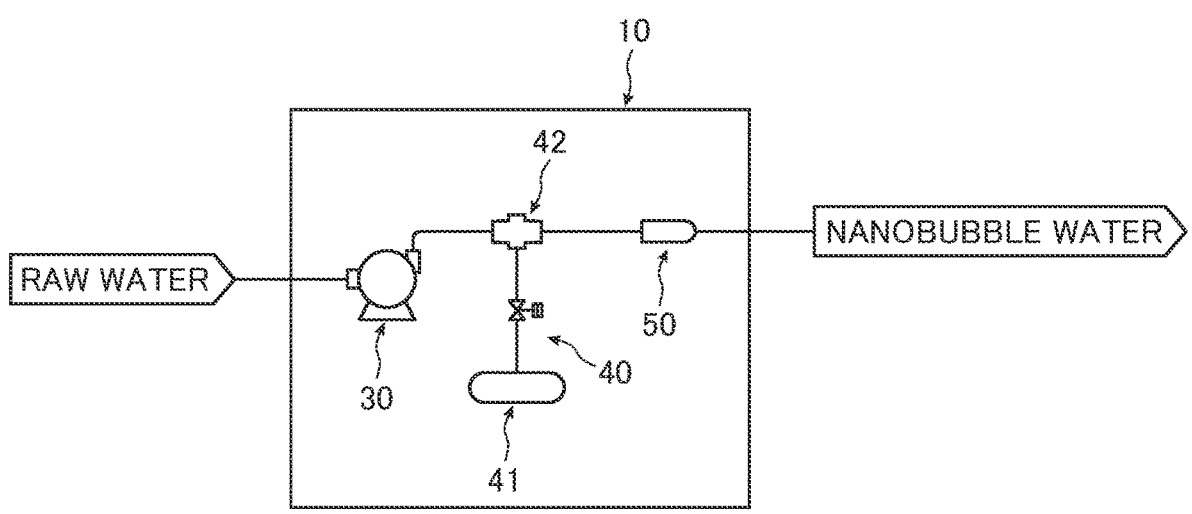

SPIDER MITE CONTROL METHOD

CROSS REFERENCE TO RELATED APPLICATIONS

This application is the U.S. National Phase under 35 U.S.C. § 371 of International Application No. PCT/JP2019/021250, filed on May 29, 2019, which claims the benefit of Japanese Application No. 2018-103188, filed on May 30, 2018, the entire contents of each are hereby incorporated by reference.

TECHNICAL FIELD

The present invention relates to a method of controlling spider mites.

BACKGROUND ART

As a method of controlling spider mites, a method of applying acaricides such as a substituted phenyl ether compound to a plant is known. For example, Patent Document 1 describes an acaricide characterized by containing a predetermined substituted phenyl ether compound as an active ingredient.

On the other hand, there is a problem that spider mites tend to acquire resistance to acaricides because of their high fertility and short period of generational change. For this reason, once spider mites have infested plants, when acaricides are used to remove the spider mites, complicated management such as use of acaricides in rotation is required. In addition, it has been known that some acaricides may also cause harm to honeybees and natural enemy insects against spider mites, and there has been a strong demand for a method of controlling spider mites, the method being capable of obtaining a high control effect even without using acaricides.

CITATION LIST

Patent Literature

Patent Literature 1: JP 2015-61825 A

SUMMARY OF INVENTION

Technical Problems

An object of the present invention is to provide a method of controlling spider mites, the method being capable of obtaining a high controlling effect even without using acaricides.

Solution to Problems

The present inventor has conducted an intensive study to attain the above-described object and found that a controlling effect on spider mites is enhanced by applying nanobubble water to a plant even without using acaricides, whereby the present invention has been completed.

That is, the present inventor found that the above-described object can be attained by the following constitution.

[1] A method of controlling spider mites, the method comprising applying nanobubble water to a plant.
[2] The method of controlling spider mites according to [1], wherein at least one of sprinkling using the nanobubble water and sprinkling of an agrochemical diluted with the nanobubble water is carried out.
[3] The method of controlling spider mites according to [1] or [2], wherein the nanobubble water contains bubbles with a modal particle size of from 10 to 500 nm.
[4] The method of controlling spider mites according to any one of [1] to [3], wherein bubbles contained in the nanobubble water include at least one type of gas selected from the group consisting of oxygen, nitrogen, carbon dioxide and ozone.
[5] The method of controlling spider mites according to any one of [1] to [4], wherein the nanobubble water contains bubbles in an amount of from $1 \times 10^8$ to $1 \times 10^{10}$ bubbles/mL.
[6] The method of controlling spider mites according to any one of [1] to [5], wherein the plant is a fruit vegetable.
[7] The method of controlling spider mites according to [6], wherein the plant is strawberry.

Advantageous Effects of Invention

The present invention can provide a method of controlling spider mites, the method being capable of obtaining a high controlling effect even without using acaricides.

BRIEF DESCRIPTION OF DRAWINGS

FIG. 1 is a schematic view showing an example of a nanobubble generating apparatus.

DESCRIPTION OF EMBODIMENTS

The present invention is described below in detail.

While the constitutional requirements may be described below based on a typical embodiment of the present invention, the present invention is not limited to the embodiment.

In the description, a numerical range indicated using the form of "(from) . . . to . . . " should read as a range including the former number as the lower limit value and the latter number as the upper limit value.

The method of controlling spider mites of the present invention (hereinafter also referred to as "controlling method of the invention") is a method of controlling spider mites where nanobubble water is applied to a plant.

Examples of the spider mites include *Tetranychus urticae*, *Tetranychus kanzawai*, *Panonychus citri*, *Panonychus ulmi*, *Eotetranychus carpini* and *Eotetranychus banksi*, but are not limited to these.

Nanobubble water and optional components used in the controlling method of the invention will be described below in detail.

[Nanobubble Water]

Nanobubble water used in the controlling method of the invention is water which contains bubbles having a diameter of less than 1 μm and into which the bubbles are incorporated. The expression "water into which the bubbles are incorporated" intends to exclude water containing the bubbles that are inevitably contained due to, for example, water (such as well water containing impurities) used to generate nanobubble water.

The diameter (particle size) of bubbles contained in nanobubble water, as well as the modal particle size of bubbles and the number of bubbles to be described later are the values that are measured using the nanoparticle tracking analysis of the Brownian motion-moving speed of bubbles in water. In the present description, numeral values measured by the nanoparticle analysis system, Nanosight series (manufactured by NanoSight Ltd.) are used.

The nanoparticle analysis system, NanoSight series (manufactured by NanoSight Ltd.) can measure the Brownian motion speed of particles and calculate the diameter (particle size) based on the measured speed. The modal particle size can be determined as the mode diameter from the particle size distribution of the existing nanoparticles.

In the present invention, the modal particle size of bubbles contained in the nanobubble water is preferably from 10 to 500 nm, more preferably from 30 to 300 nm, and even more preferably from 70 to 130 nm, because the controlling effect on spider mites can be further improved.

Gas constituting bubbles contained in the nanobubble water is not particularly limited but is preferably gas other than hydrogen from the view point of a longtime existence in water. Specific examples of the gas include air, oxygen, nitrogen, fluorine, carbon dioxide and ozone.

Among these, it is preferable to contain at least one type of gas selected from the group consisting of oxygen, nitrogen, carbon dioxide and ozone because the controlling effect on spider mites can be further improved. In particular, it is more preferable to contain oxygen because a plant grows well, and the bubbles can exist for a longer period of time.

Here, "containing oxygen" means to contain oxygen at a higher concentration than the oxygen concentration in air. The same applies to nitrogen and carbon dioxide. The oxygen concentration is preferably not less than 30 vol % of the bubbles, and preferably more than 50 vol % and not more than 100 vol %.

The nanobubble water contains bubbles in an amount of preferably from $1\times10^8$ to $1\times10^{10}$ bubbles/mL because the controlling effect on spider mites is further improved, more preferably more than $1\times10^8$ bubbles/mL and less than $1\times10^{10}$ bubbles/mL, and even more preferably from $5\times10^8$ to $5\times10^9$ bubbles/mL because the bubble generation time and the bubble existence are particularly well balanced. In particular, when the amount of bubbles in the nanobubble water exceeds $5\times10^8$ bubbles/mL, effects such as elimination of the need for applying agrochemicals required in the conventional cultivation method are more remarkable, and the controlling effect on spider mites owing to the nanobubble water can be sufficiently enjoyed.

The nanobubble water may further contain an additional component other than water and bubbles.

Examples of the additional components include a fertilizer and an agrochemical. The type and an amount of an additional component in the nanobubble water are not particularly limited and may be selected depending on the intended purpose.

Meanwhile, in the present invention, it is preferable that the additional component contains substantially no radical in the nanobubble water. "Containing substantially no radical" does not mean to exclude a case where a radical is inevitably contained due to water (e.g., well water containing impurities) used to generate the nanobubble water but means to exclude a case where a radical is generated and added through a certain operation.

In addition, since the controlling method of the invention has a high controlling effect even without using acaricides, the nanobubble water may not contain an agrochemical including an acaricide.

Exemplary methods of generating the nanobubble water include a static mixer method, a venturi method, a cavitation method, a vapor condensation method, an ultrasonic method, a swirling flow method, a pressurized dissolution method and a fine pore method.

The controlling method of the invention may include a generation step of generating the nanobubble water prior to application of the nanobubble water. That is, the controlling method of the invention may be a controlling method including, for example, a generation step of introducing water from a water source such as a water storage tank, a well or agricultural water into a nanobubble generating apparatus to generate nanobubble water, and an application step of applying the generated nanobubble water. Exemplary techniques of introducing water from a water source into a nanobubble generating apparatus include a technique in which water is drawn from a water source using a tub, a pump or another device and supplied to the nanobubble generating apparatus, and a technique in which water is directly supplied to a nanobubble generating apparatus from a flow path that is installed between a water source and the nanobubble generating apparatus and connected to the nanobubble generating apparatus.

As the method of generating the nanobubble water, a generation method using an apparatus that does not intentionally generate a radical is preferred, and a specific example thereof is a generation method using, for instance, the nanobubble generating apparatus described in paragraphs [0080] to [0100] of JP2018-15715 A. The foregoing is incorporated in the present description.

Another example of the nanobubble generating apparatus that does not intentionally generate a radical is an ultrafine bubble generating apparatus including a liquid discharger that discharges water, a gas incorporating device that pressurizes gas and incorporates the gas into the water discharged from the liquid discharger, and an ultrafine bubble generator that allows the water having the gas incorporated therein to pass through an inside of the ultrafine bubble generator to generate ultrafine bubbles in the water, wherein, between the liquid discharger and the ultrafine bubble generator, the gas incorporating device pressurizes gas and incorporates the gas into a liquid being in a pressurized state flowing toward the ultrafine bubble generator. Specifically, a generation method using a nanobubble generating apparatus shown in FIG. 1 is exemplified.

A nanobubble generating apparatus 10 shown in FIG. 1 includes therein a liquid discharger 30, a gas incorporating device 40 and a nanobubble generating nozzle 50.

The liquid discharger 30 comprising a pump draws raw water of nanobubble water (e.g., well water) therein and discharges the raw water. The gas incorporating device 40 includes a vessel 41, in which pressurized gas is enclosed, and a substantially cylindrical gas incorporating device body 42. While allowing the water discharged from the liquid discharger 30 to flow inside the gas incorporating device body 42, the gas incorporating device 40 introduces the pressurized gas of the vessel 41 into the gas incorporating device body 42. In this manner, gas-incorporated water is generated in the gas incorporating device body 42.

The nanobubble generating nozzle 50 is to generate nanobubbles in the gas-incorporated water according to the principle of pressurized dissolution when the gas-incorporated water passes through an inside of the nanobubble generating nozzle 50, and the structure thereof may be the same as the structure of the nanobubble generating nozzle described in JP2018-15715 A. Nanobubble water generated in the nanobubble generating nozzle 50 is ejected from a tip end of the nanobubble generating nozzle 50, then flows out the nanobubble generating apparatus 10, and is delivered to a predetermined destination via a flow path that is not shown.

As described above, between the liquid discharger 30 and the nanobubble generating nozzle 50 in the nanobubble generating apparatus 10, the gas incorporating device 40 introduces pressurized gas into water (raw water) being in a pressurized state flowing toward the nanobubble generating nozzle 50. In this manner, defects such as cavitation that may occur when gas is incorporated into water on the intake side (suction side) of the liquid discharger 30 can be avoided. Since gas is incorporated into water as being in a pressurized (compressed) state, gas can be incorporated into water against the water pressure at the gas incorporation location. Accordingly, gas can be appropriately incorporated into water without particularly generating a negative pressure at the gas incorporation location.

In addition, the liquid discharger 30 is connected on the suction side thereof with the flow path of water supplied from a water source such as a well or a water tap, and the pressure of the water flowing from the upstream side of the liquid discharger 30 into the liquid discharger 30 in the flow path (i.e., the water pressure on the suction side) is preferably a positive pressure. When this is the case, the above-described constitution is more effective. More specifically, when the water pressure (the suction pressure) on the upstream side of the liquid discharger 30 is a positive pressure, gas is incorporated into water on the downstream side of the liquid discharger 30; the constitution of the nanobubble generating apparatus 10 capable of appropriately incorporating gas into water also on the downstream side of the liquid discharger 30 becomes more significant.

Further, water used to generate the nanobubble water is not particularly limited, and use can be made of, for example, rainwater, tap water, well water, agricultural water and distilled water.

Such water may be water that has been subjected to another treatment before being used to generate nanobubble water. Another treatment may be exemplified by pH adjustment, precipitation, filtration, or disinfection (sterilization). In particular, when agricultural water is used, for instance, agricultural water that has been typically subjected to at least one of precipitation and filtration may be used.

In the present invention, a mode of applying the nanobubble water to a plant varies depending on the plant cultivation method and thus is not particularly limited, and examples thereof include a mode where the nanobubble water is sprinkled in the soil culture, a mode where an agrochemical diluted with the nanobubble water is sprinkled in the soil culture, a mode where a culture medium is supplied with a culture liquid diluted with the nanobubble water in the nutrient solution culture (water culture, spray culture or solid medium culture) or nutrient-solution soil culture (irrigation and fertilization culture), and a mode where the nanobubble water alone is watered (applied through irrigation) in the nutrient-solution soil culture.

Among these, the mode where at least one of sprinkling using the nanobubble water and sprinkling of an agrochemical diluted with the nanobubble water is carried out is preferred because the operation is simple and the controlling effect on spider mites can be further improved.

Here, the method of "sprinkling water" as one of the application modes is not particularly limited, and when the culture method is the soil culture, for example, a method involving spraying water over an entire of a plant, a method involving spraying water over a part of a plant (e.g., stems or leaves), and a method involving spraying water over soil in which a plant is planted may be adopted. When the culture method is the nutrient-solution soil culture, the water sprinkling may be carried out through irrigation as described above.

In the present invention, the application time of the nanobubble water to a plant varies depending on the application mode and the plant type and thus is not particularly limited. For example, when fruit vegetables are cultivated in the soil culture, the application time may be an entire period from the seeding to the harvesting, or the nanobubble water may be applied only in a certain period of time (e.g., at the seeding and in the seeding-raising period).

The plant to which the nanobubble water is applied is not particularly limited, and any plant may be used as long as it is to be infested with or is likely to be infested with spider mites. In addition, the plant may be in a state of being grown in an agricultural field or the like, or may be in a state after being harvested.

Example of such a plant include fruit vegetables such as solanaceous plants (for example, eggplant, pepino, tomato (including grape tomato), tamarillo, *Capsicum annum*, shishito pepper, habanero, bell pepper, paprika and colored bell pepper), araliaceous plants (for example, *Gamblea innovans*), cucurbitaceous plants (for example, pumpkin, zucchini, cucumber, *Cucumismetuliferus, Cucumis melo* var. conomon, *Momordica charantia, Benincasa hispida*, chayote, *Luffa cylindrica*, calabash, watermelon, melon and *Cucumis melo* var. makuwa), malvaceae plants (for example, okra), and rosaceous plants (for example, strawberry);

grains such as rice, wheat, and corn;

beans such as adzuki bean, kidney bean, pea, green soybean, cowpea, winged bean, broad bean, soybean, sword bean, peanut, lentil, and sesame;

leafy vegetables such as common ice plant, *Angelica keiskei, Brassica juncea*, cabbage, watercress, kale, komatsuna (*Brassica rapa* var. perviridis), butterhead lettuce (*Lactuca sativa* var. capitata), red leaf lettuce, choy sum, Korean lettuce (*Lactuca sativa* var. crispa), Shantung vegetables, *perilla*, garland *chrysanthemum*, water shield, shirona cabbage (*Brassica campestris* var. amplexicaulis), Japanese parsley, celery, tatsoi, Japanese radish leaves (suzushiro), *Brassica juncea* var. integrifolia, chisha lettuce, bok choy, Tsukena (*Brassica campestris* L.), field mustard, Nozawana (*Brassica rapa* L. var. hakabura), Chinese cabbage, parsley, Haruna vegetables, chard, spinach, henbit, potherb mustard, *Stellaria neglecta, Stellaria media, Stellaria aquatica, Brassica rapa* var. laciniifolia subvar. oblanceolata, Japanese honeywort, Brussels sprouts, mulukhiyah, leaf lettuce, arugula, lettuce, and Japanese horseradish leaves;

stem vegetables such as green onion, small green onion, *Allium schoenoprasum* var. *foliosum, Allium tuberosum*, asparagus, *Aralia cordata*, kohlrabi, zha cai, bamboo shoot, garlic, *Ipomoea aquatica*, tree onion, and onion;

flowering vegetables such as artichoke, broccoli, cauliflower, edible *chrysanthemum*, rapeseed, *Petasites japonicus*, and Japanese ginger;

sprout vegetables such as sprout, bean sprout, and white radish sprout;

root vegetables such as turnip, Japanese radish, *Raphanus sativus* L. var. *sativus*, Japanese horseradish, horseradish, burdock, Chinese artichoke, ginger, carrot, *Allium chinense*, lotus root, and lily bulb;

potatoes such as sweet potato, taro, potato, Chinese yam (Japanese yam), and *Dioscorea japonica*; and fruit trees such as rutaceous plants (for example, citrus unshiu), rosaceous plants (for example, apple, peach, plum, *Myrica rubra, Pseudocydonia sinensis*, nashi (*Pyrus pyrifolia*), pear, *Prunus* mume, apricot, cherry, *rubus*, raspberry, blackberry and loquat), musaceous plants (for example, banana), vitaceous plants (for example, grape), elaeagnaceous plants (for example, *oleaster*), ericaceous plants (for example, blueberry), moraceous plants (for example, mulberry and fig), ebenaceous plants (for example, persimmon), lardizabalaceous plants (for example, Akebia quinata), anacardiaceous plants (for example, mango), lauraceous plants (for example, avocado), rhamnaceous plants (for example, jujube), lythraceous plants (for example, pomegranate), passifloraceous plants (for example, passion fruit), bromeliaceous plants (for example, pineapple), caricaceous plants (for example, *papaya*), actinidiaceous plants (for example, kiwifruit), fagaceous plants (for example, chestnut), sapotaceous plants (for example, miracle fruit), myrtaceous plants (for example, guava), oxalidaceous plants (for example, star fruit), and malpighiaceous plants (for example, acerola).

Among these, fruit vegetables are preferred because a more excellent effect of the present invention can be obtained, and in particular, strawberry is more preferred because the cultivation period thereof is long and it is difficult to continuously use acaricides.

Examples

The present invention is described below more specifically by way of examples. The materials, amounts of use, ratios, treatments and treatment procedures illustrated in the examples below may be modified as appropriate as long as they do not depart from the scope and spirit of the present invention. Therefore, the scope of the present invention should not be construed as being limited to the following examples.

(Experiment 1)
<Details of Experiment 1>

Experiment 1 was carried out in greenhouses in which strawberry (variety: FUKUHARUKA) was cultivated in Iwaki-shi, Fukushima from September, 2017 to April, 2018, with the following separated areas.

Test area 1-1: Nanobubble water generated by the following method was used for sprinkling in elevated cultivation using culture soil.

Test area 1-2: Well water was used for sprinkling in elevated cultivation using culture soil, and nanobubble water was not used.

The test areas were divided with adjacent greenhouses, and approximately 3500 plants of strawberry were cultivated in each greenhouse.

According to a normal method, the frequency of sprinkling and the sprinkling amount were appropriately varied depending on the growth of strawberry, the weather or other factors and were controlled to be generally same in both the test areas.

In both the test areas, "SULFUR FLOWABLE" and the acaricide "SIGNUM" were sprinkled about once or twice a month. At this time, nanobubble water was used for dilution of the above-mentioned "SULFUR FLOWABLE" and "SIGNUM" in Test area 1-1, and well water was used for dilution thereof in Test area 1-2.

<Nanobubble Water Generation Method>

Nanobubble water was generated using a nanobubble generating apparatus [200V, 10 L/min type; manufactured by Kakuichi Co., Ltd., Aqua Solution Division (currently Aqua Solutions Corporation)] where bubbles (nanobubbles) were generated in water by the pressurized dissolution.

Water used to generate nanobubble water was well water, and the gas used to form the bubbles was oxygen (industrial oxygen, oxygen concentration: 99.5 vol %).

Nanobubbles were generated using the foregoing nanobubble generating apparatus under the conditions with which the analysis by the nanoparticle analysis system, NanoSight LM10 (manufactured by NanoSight Ltd.) would have the following results.

Number of bubbles per 1 mL of water: $5 \times 10^8$ bubbles/mL

Modal particle size of bubbles: 100 nm

<Evaluation of Controlling Effect on Spider Mites>

For 10 plants arbitrarily selected in each greenhouse, the number of adult spider mites in one spread leaf per plant was investigated at a frequency of once a month from September to January. The investigation results were evaluated according to the following criteria and are summarized in Table 1.

(Evaluation Criteria)

A: Neither spider mite infestations nor spider mite carcasses were found.

B: On average, 1 or more and less than 30 spider mite infestations were found.

C: On average, 30 or more and less than 70 spider mite infestations were found.

D: On average, 70 or more spider mite infestations were found.

TABLE 1

|  | September | October | November | December | January |
|---|---|---|---|---|---|
| Test area 1-1 | A | A | A | A | A |
| Test area 1-2 | A | B | C | C | C |

From the results shown in Table 1, in Test area 1-1 in which the nanobubble water was used for sprinkling, neither spider mite infestations nor spider mite carcasses were found. Therefore, it was revealed that the application of the nanobubble water prevented the spider mite infestations.

On the other hand, the desired effect could not be obtained in Test area 1-2 in which the nanobubble water was not used.

(Experiment 2)

Experiment 2 was carried out in an agricultural field of strawberry (variety: BENI-HOPPE) cultivation in Komoro-shi, Nagano from September, 2018 to January, 2019, with the following separated areas. The respective test areas were made in the same plastic house.

Test area 2-1: In the plastic house culture, agricultural water was used for daily sprinkling, and nanobubble water was not used.

Test area 2-2: In the plastic house culture, nanobubble water in which the number of bubbles per 1 mL of water was adjusted to $2 \times 10^8$ bubbles/mL was used for daily sprinkling.

Test area 2-3: In the plastic house culture, nanobubble water in which the number of bubbles per 1 mL of water was adjusted to $5 \times 10^8$ bubbles/mL was used for daily sprinkling.

In each of the test areas, 5 plants of strawberry were cultivated. According to a normal method, the frequency of sprinkling and the sprinkling amount were appropriately varied depending on the growth of strawberry, the weather or other factors and were controlled to be generally same in the three test areas. In addition, in Experiment 2, application of agrochemicals was purposely omitted in order to verify the superiority associated with the number of bubbles in 1 mL of nanobubble water.

<Nanobubble Water Generation Method>

Nanobubble water was generated using a nanobubble generating apparatus (100V, 10 L/min type; manufactured by Aqua Solutions Corporation) where bubbles (nanobubbles) were generated in water by the pressurized dissolution. Water used to generate nanobubble water was agricultural water, and the gas used to form the bubbles was oxygen (industrial oxygen, oxygen concentration: 99.5 vol %).

Among the conditions for generating nanobubbles using the foregoing nanobubble generating apparatus, the bubble size (modal particle size) was set to be 100 nm. The number of bubbles per 1 mL of nanobubble water was $2 \times 10^8$ bubbles/mL in Test area 2-2 and was $5 \times 10^8$ bubbles/mL in Test area 2-3 as described above. The number of bubbles per 1 mL of nanobubble water can be adjusted by, for example, providing a nanobubble water storage tank on the downstream side of the nanobubble generating apparatus, sending nanobubble water of the storage tank back to the nanobubble generating apparatus to allow the nanobubble water to circulate in the system, and varying the circulation time.

<Evaluation of Controlling Effect on Spider Mites>

In each test area, the quantity of spider mites generated on 10 leaves arbitrarily selected from each of 5 plants was evaluated according to the following criteria during the cultivation period (specifically in the middle of the harvesting), and the number of the plants falling into each evaluation category was counted.

[Evaluation Categories]

"No generation": No spider mite was confirmed

"Generated in small quantity": The presence of spider mites could be confirmed by a magnifying lens or other devices, although it could not be confirmed with a naked eye "Generated in large quantity": Spider mites could be confirmed with a naked eye The evaluation results in the respective test areas are as shown in Table 2 below.

TABLE 2

|  | Test area 2-1 | Test area 2-2 | Test area 2-3 |
| --- | --- | --- | --- |
| No generation | 1 | 3 | 4 |
| Generated in small quantity | 2 | 2 | 1 |
| Generated in large quantity | 2 | 0 | 0 |

As is evident from the above evaluation results, compared to Test area 2-1 where nanobubble water was not applied, in Test area 2-2 and Test area 2-3 where nanobubble water was applied, the quantity of generated spider mites was reduced, and any plants in which spider mites were generated in a large quantity were not confirmed in Test area 2-2 and Test area 2-3.

In addition, in Test area 2-3 where the number of bubbles in 1 mL of nanobubble water was $5 \times 10^8$ bubbles/mL, the generation of spider mites was more suppressed than that in Test area 2-2 where the number of bubbles was $2 \times 10^8$ bubbles/mL, even though sprinkling of agrochemicals was intentionally not performed.

As describe above, the results of Experiment 1 and Experiment 2 clearly show the controlling effect on spider mites owing to the nanobubble water.

REFERENCE SIGNS LIST 10 nanobubble generating apparatus
30 liquid discharger
40 gas incorporating device
41 vessel
42 gas incorporating device body
50 nanobubble generating nozzle

The invention claimed is:

1. A method of controlling spider mites without using acaricides, the method comprising
generating nanobubbles in water by pressurized dissolution to generate nanobubble water, and
applying the nanobubble water to a plant infested with spider mites, wherein applying comprises sprinkling the nanobubble water onto the plant.

2. The method of controlling spider mites according to claim 1,
wherein the nanobubble water contains bubbles with a modal particle size of from 10 to 500 nm.

3. The method of controlling spider mites according to claim 1,
wherein bubbles contained in the nanobubble water include at least one type of gas selected from the group consisting of oxygen, nitrogen, carbon dioxide and ozone.

4. The method of controlling spider mites according to claim 1,
wherein the nanobubble water contains bubbles in an amount of from $1 \times 10^8$ to $1 \times 10^{10}$ bubbles/mL.

5. The method of controlling spider mites according to claim 1,
wherein the plant is a fruit vegetable.

6. The method of controlling spider mites according to claim 5, wherein the plant is strawberry.

7. The method of controlling spider mites according to claim 1,
wherein the nanobubble water contains bubbles in an amount of from $5 \times 10^8$ to $1 \times 10^{10}$ bubbles/mL.

* * * * *